Dec. 16, 1969   C. E. G. M. M. VAN VROONHOVEN   3,484,362
FILTERING APPARATUS USING AN ELECTRIC FIELD
Filed Oct. 25, 1966
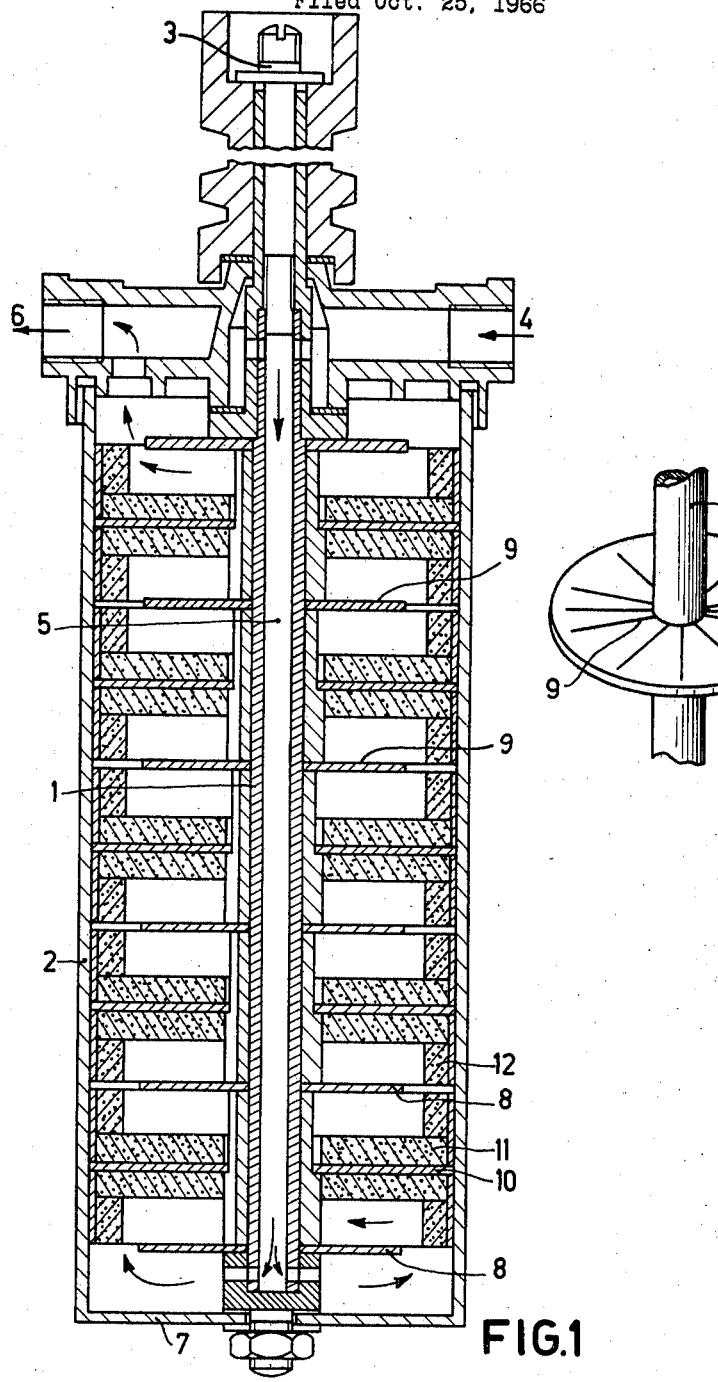
INVENTOR
CASPER E. G. M. M. VAN VROONHOVEN
BY
AGENT.

United States Patent Office 3,484,362
Patented Dec. 16, 1969

3,484,362
FILTERING APPARATUS USING AN ELECTRIC FIELD
Casper Ebeline Gerardus Martinus Marie van Vroonhoven, Emmasingel, Eindhoven, Netherlands, assignor, by mesne assignments, to U.S. Philips Corporation, New York, N.Y., a corporation of Delaware
Filed Oct. 25, 1966, Ser. No. 589,345
Claims priority, application Netherlands, Oct. 30, 1965, 6514115
Int. Cl. B03c 5/00; B01d 35/06
U.S. Cl. 204—302                     6 Claims

ABSTRACT OF THE DISCLOSURE

Apparatus for filtering particles from a flowing fluid, the apparatus including in a housing interleaved electrode elements defining a tortuous passage, with dielectric filtering material disposed between adjacent elements and a resulting non-homogeneous electric field within the flow passage.

---

The invention relates to a device for removing solid particles from a flowing medium comprising an inlet and an outlet which define the main direction of flow of the medium and between which two parallel electrodes are arranged. After the device has been connected to a high electric voltage, an non-homogeneous electric field is produced between the electrodes, an electrically non-conducting filtering mass being interposed between these electrodes and in the proximity of one of the electrodes and a space being available between the other electrode and this filtering mass for permitting the medium to pass.

Such devices are particularly suitable for rapidly and thoroughly removing contaminations from liquids, more particularly from transformer or capacitor oil.

Tests have shown that contaminations in the form of very small particles are injected into electric inhomogeneous fields due to great gradient forces in the filtering mass which may consist, for example, of sintered glass particles.

A known device has a wire-shaped electrode acting as spraying electrode which is centrally arranged in a tubular second electrode. Both electrodes extend parallel to the main direction of flow of the capacitor oil to be purified. In spite of a satisfactory operation, the efficiency of this filter it not high, however.

The device in accordance with the invention has for its object to provide an improvement in this respect in that the active parts of the electrodes are constituted by protuberances aranged transversely of the main direction of flow of the medium so as to mesh into each other. Thus, the medium may be worked, so to say, more intensively. A high efficiency may also be obtained with smaller dimensions of the filter.

Particularly effective is the operation of a filter in which the protuberances of an electrode acting as spraying electrode are wire-shaped. The wire-shaped parts may then be provided on one side or on both sides of one or more plates of insulating material, the wires located on one side of the insulation plates being at an angle to each other. In cylindrical filters, these wires should preferably extend radially.

In a favourable embodiment in accordance with the invention, these are arranged opposite the wire-shaped parts of the spraying electrodes protuberances of other electrode in the form of metal discs, each disc being provided on one side or on both sides with the said filtering mass. Due to the presence both of the insulation plates and of the metal discs the direction of flow changes each time so that the liquid compulsorily gets more into contact with the active parts of the electrode.

Alternatively, the wires of the spraying electrode may be helically wound around the protuberant parts of the electrode, the latter parts then being entirely surrounded by the said filtering mass.

All these embodiments may have a spraying electrode which is centrally arranged in or in the proximity of the centre line of a second electrode entirely surrounding the spraying electrode. It is particularly favourable if this spraying electrode is hollow and is used as inlet for a flowing medium.

A particularly advantageous embodiment in accordance with the invention operating very effectively is a filter having a centrally arranged hollow spraying electrode which can be connected to a high electric voltage and which is provided in a metal tube acting as second electrode and connected to earth, the space between the electrodes being filled by stacking a plurality of filter units successively constituted by an insulation disc disposed around the spraying electrode and provided on either side with radial metal wires electrically connected with the spraying electrode, a spacer ring engaging the tube, a disc of filtering mass and a metal disc electrically connected with the inner side of the tube. This filter can be readily purified. The filter units can be slipped out of the tubular electrodes, whereupon the soiled discs of filtering mass can be replaced.

The invention will now be described more fully with reference to the drawing.

FIG. 1 is a cross-sectional view of an electrostatic filter in accordance with the invention, and FIG. 2 is a perspective view of a detail thereof.

The filter shown in FIG. 1 is composed of a centrally arranged hollow spraying electrode 1 and a tubular second electrode 2 surrounding the spraying electrode 1. Both electrodes are made of brass. The spraying electrode 1 can be connected through a terminal 3 to a high voltage of from 10 to 25 kv. The whole filter is provided with an inlet 4 which is connected with the outer side 5 of the spraying electrode 1 and an outlet 6. The tubular electrode 2 is closed on the lower side 7 and is filled with filter units slipped into this tubular electrode. These filter units consist of circular insulation plates 8 both the upper and the lower sides of which are provided with radial copper wires 9. This is illustrated in detail in FIG. 2. The wires 9 are in electric contact with the spraying electrode 1. The filter units further consist of copper discs 10 engaging the inner side of the electrode 2. The discs 10 are provided on either side with slightly thicker and further equal discs 11 of filtering mass. The spacer rings, 12, likewise consisting of filtering mass, holds the brass discs 10 at a certain distance. The tubular electrode 2 tightly surrounds the discs 10 which are consequently in electric contact with this electrode. The filtering mass may consist of sintered glass particles. The liquid to be purified, for example capacitor oil, enters the filter at the inlet 4, flows downwards through the hollow electrode 5 and then passes in order of succession all filter units in upward direction along a zigzag-shaped path.

What is claimed is:

1. In an apparatus for filtering particles from a flowing fluid, the apparatus including a housing defining therein a flow passage between inlet and outlet means, and first and second electrodes connectible to an electrical potential for creating an electrical field in said flow passage, the improvement in combination therewith, comprising:

(a) a tube being the first electrode connected to a high voltage and disposed centrally in the chamber, one end of the tube in communication with said inlet and the opposite end open to said chamber, the housing being the second grounded electrode, (b) a plurality of interleaved first and second elements extending transversely in the flow passage from the first and second electrodes respectively toward each other, the first elements formed of plates of dielectric filtering mass spaced axially on the tube and having wires connected to the tube and disposed generally radially on both surfaces of each plate, the second elements being complementary plates with dielectric filtering mass in the spaces between the first and second elements, whereby a non-homogeneous electric field is established across said electrodes and filtering mass.

2. Apparatus associated with an electrical potential for filtering particles from a flowing fluid, comprising:
(a) a housing having an inlet, an outlet, and an interior chamber as a principal flow passage,
(b) a first electrode having a plurality of first spaced elements extending transversely of the main flow passage,
(c) a second electrode having a plurality of second elements extending generally between and spaced from the first elements, the spaces between the elements being of varying diameters and defining a tortuous flow passage,
(d) dielectric, porous filtering mass disposed in said chamber between each pair of adjacent first and second elements, and
(e) circuit means for connecting said electrical potential across said first and second electrodes, for establishing a non-homogeneous electric field between the electrodes and the filtering mass.

3. Apparatus as defined in claim 2 wherein the first electrode is formed as a tube disposed in the chamber, the tube having (a) a first end in communication with said inlet,
(b) the opposite second end open to said chamber, the second end being remote from the outlet, with said flow passage being defined therebetween, and
(c) the first elements extending laterally from the outside of the tube.

4. Apparatus as defined in claim 3 wherein said housing comprises the second electrode, and said first and second elements are axially spaced plates secured to said electrodes and extending radially outward and inward respectively.

5. Apparatus as defined in claim 2 wherein said elements of one of the electrodes comprise a plurality of wires located at least on one side on a portion of said filtering mass.

6. Apparatus as defined in claim 2 wherein said elements of at least one electrode comprise a helically wound wire surrounded by portions of said filtering mass.

References Cited

UNITED STATES PATENTS

| | | | |
|---|---|---|---|
| 987,116 | 3/1911 | Cottrell et al. | 204—308 |
| 2,425,355 | 8/1947 | Roberts | 204—304 |
| 3,190,827 | 6/1965 | Kok et al. | 204—186 |
| 3,252,885 | 5/1966 | Griswold | 204—302 |
| 3,324,026 | 6/1967 | Waterman et al. | 204—302 |

FOREIGN PATENTS 463,373  2/1950  Canada.

JOHN H. MACK, Primary Examiner

T. TUFARIELLO, Assistant Examiner

U.S. Cl. X.R.

204—186, 288